(12) United States Patent
Ojima et al.

(10) Patent No.: US 11,198,219 B2
(45) Date of Patent: Dec. 14, 2021

(54) CONTROLLER, CONTROL SYSTEM, AND CONTROL METHOD

(71) Applicant: KABUSHIKI KAISHA YASKAWA DENKI, Kitakyushu (JP)

(72) Inventors: Masao Ojima, Fukuoka (JP); Kanji Takanishi, Fukuoka (JP); Yutaro Uchida, Fukuoka (JP)

( * ) Notice: Subject to any disclaimer, the term of this patent is extended or adjusted under 35 U.S.C. 154(b) by 451 days.

(21) Appl. No.: 15/921,585

(22) Filed: Mar. 14, 2018

(65) Prior Publication Data
US 2018/0264651 A1 Sep. 20, 2018

(30) Foreign Application Priority Data
Mar. 16, 2017 (JP) .............................. JP2017-051289

(51) Int. Cl.
*B25J 9/16* (2006.01)
*B25J 9/04* (2006.01)
(Continued)

(52) U.S. Cl.
CPC ............. *B25J 9/1669* (2013.01); *B25J 9/046* (2013.01); *B25J 9/16* (2013.01); *B25J 9/1602* (2013.01);
(Continued)

(58) Field of Classification Search
CPC ........ B25J 9/046; B25J 19/16; B25J 19/1602; B25J 9/1656; B25J 13/006; B25J 9/1669;
(Continued)

(56) References Cited

U.S. PATENT DOCUMENTS

2006/0074527 A1* 4/2006 Bhatt ................. G05B 19/4086
700/251
2007/0120513 A1* 5/2007 Tanaka ................. G05B 19/414
318/568.11
(Continued)

FOREIGN PATENT DOCUMENTS

CN 104827473 8/2015
EP 1643327 4/2006
(Continued)

OTHER PUBLICATIONS

Understanding the IEC61131-3 Programming Languages, 2009, Bosch Rexroth Corporation, p. 6 (Year: 2009).*
(Continued)

*Primary Examiner* — Jeff A Burke
*Assistant Examiner* — Jamal A Shah
(74) *Attorney, Agent, or Firm* — Soei Patent & Law Firm (57) ABSTRACT

A control system 1 includes a first controller, and a second controller. The second controller includes a program storage module that stores two or more coordinate conversion programs, and a control processing module 240 that acquires program designation information for designating one of two or more coordinate conversion programs from the first controller. Additionally, the control processing module may acquire a first operation command in the coordinate system for the first controller from the first controller, and convert the first operation command to an operation target value of two or more joint axes of a multi-axis robot using the coordinate conversion programs according to the program designation information. Driving power according to the operation target value may be output to the joint axes.

20 Claims, 5 Drawing Sheets

(51) Int. Cl.
  *B25J 13/00* (2006.01)
  *G05B 19/408* (2006.01)
  *G05B 19/418* (2006.01)
(52) U.S. Cl.
  CPC ........... *B25J 9/1656* (2013.01); *B25J 13/006* (2013.01); *G05B 19/408* (2013.01); *G05B 19/4086* (2013.01); *G05B 19/418* (2013.01); *G05B 2219/2214* (2013.01); *G05B 2219/33263* (2013.01); *G05B 2219/33269* (2013.01); *G05B 2219/36231* (2013.01); *G05B 2219/36232* (2013.01); *Y02P 90/02* (2015.11); *Y10S 901/06* (2013.01); *Y10S 901/15* (2013.01)
(58) Field of Classification Search
  CPC .............. G05B 19/408; G05B 19/4086; G05B 19/418; G05B 2219/2214; G05B 2219/33263; G05B 2219/33269; G05B 2219/36231; G05B 2219/36232; Y02P 90/02; Y10S 901/06; Y10S 901/15
  See application file for complete search history.

(56) References Cited

U.S. PATENT DOCUMENTS

| | | | |
|---|---|---|---|
| 2012/0109361 A1* | 5/2012 | Chang | G05B 19/408 700/186 |
| 2013/0166068 A1 | 6/2013 | Yanagita et al. | |
| 2015/0217445 A1 | 8/2015 | Hietmann et al. | |
| 2016/0023355 A1 | 1/2016 | Komatsu et al. | |
| 2017/0033989 A1* | 2/2017 | Toprani | H04L 41/0846 |
| 2017/0344504 A1* | 11/2017 | Wasserman | G06F 13/105 |
| 2019/0184559 A1* | 6/2019 | Lager | G05B 19/4182 |

FOREIGN PATENT DOCUMENTS

| | | |
|---|---|---|
| JP | S59-229614 | 12/1984 |
| JP | H4-347703 | 12/1992 |
| JP | H9-044226 | 2/1997 |
| JP | H9-047990 | 2/1997 |
| JP | H10-020910 | 1/1998 |
| JP | 2013-134786 | 7/2013 |
| KR | 960003719 | 5/1996 |
| WO | 2014/148032 | 9/2014 |

OTHER PUBLICATIONS

Extended Search Report in corresponding European Application No. 18161639.2, dated Oct. 25, 2018.

Office Action issued in Japanese Patent Application No. P2017-051289, dated Jan. 14, 2020 (with English partial translation).

Office Action issued in European Patent Application No. 18161639.2, dated Jan. 19, 2021.

Office Action issued in Chinese Patent Application No. 201810210252.5, dated Apr. 6, 2021 (with English partial translation).

* cited by examiner

CONTROLLER, CONTROL SYSTEM, AND CONTROL METHOD

CROSS-REFERENCE TO RELATED APPLICATION

This application is based upon and claims the benefit of priority from Japanese Patent Application No. 2017-051289, filed on Mar. 16, 2017, the entire contents of which are incorporated herein by reference.

BACKGROUND

1. Field

The present disclosure relates to a controller, a control system, and a control method.

2. Description of the Related Art

Japanese Unexamined Patent Publication No. 2013-134786 discloses a method of converting a numerical control language program configured to be executed by a computer of a numerically controlled machine tool to a robot language program to record the robot language program in a mass storage device, and executing the robot language program using a robot control unit connected to the mass storage device and a robot.

SUMMARY

A control system according to one or more embodiments of the present disclosure includes a first controller configured to control two or more controlled objects, and a second controller configured to control a multi-axis robot in accordance with a command from the first controller. The second controller includes a power output module configured to output driving power to two or more joint axes of the multi-axis robot, a storage module configured to store two or more coordinate conversion programs, a first communication module configured to input and output information to and from the first controller, and a control processing module configured to acquire program designation information for designating any one of the coordinate conversion programs from the first controller via the first communication module. According to some embodiments, the control processing module is further, configured to acquire or receive an operation command in a coordinate system for the first controller from the first controller via the first communication module, convert the operation command to an operation target value of the joint axes of the multi-axis robot using the coordinate conversion programs according to the program designation information, and output the driving power according to the operation target value to the joint axes via the power output module.

A controller according to one or more example embodiments of the present disclosure includes a power output module configured to output driving power to two or more joint axes of a multi-axis robot, a storage module configured to store two or more coordinate conversion programs, a first communication module configured to input and output information to and from a first controller that controls two or more controlled objects, and a control processing module configured to acquire program designation information for designating any one of the coordinate conversion programs and an operation command in a coordinate system for the first controller from the first controller via the first communication module. Additionally, the control processing may be configured to convert the operation command to an operation target value of the joint axes of the multi-axis robot using the coordinate conversion programs according to the program designation information, and output the driving power according to the operation target value to the joint axes via the power output module.

A control method according to one or more example embodiment of the present disclosure is performed by a second controller which controls the multi-axis robot in response to a command from a first controller which controls two or more controlled objects. The control method may comprise storing two or more coordinate conversion programs, and acquiring program designation information for designating any one of the coordinate conversion programs and an operation command in a coordinate system for the first controller from the first controller. Additionally, the control method may comprise converting the operation command to operation target values of two or more joint axes of the multi-axis robot using the coordinate conversion programs according to the program designation information, and outputting driving power according to the operation target value to the joint axes.

DETAILED DESCRIPTION

Hereinafter, embodiments will be described in detail with reference to the drawings. Note that in the description, elements having the same element or the same function are denoted by the same reference numerals, and duplicate explanation is omitted.

[Control System]

Figure 1:
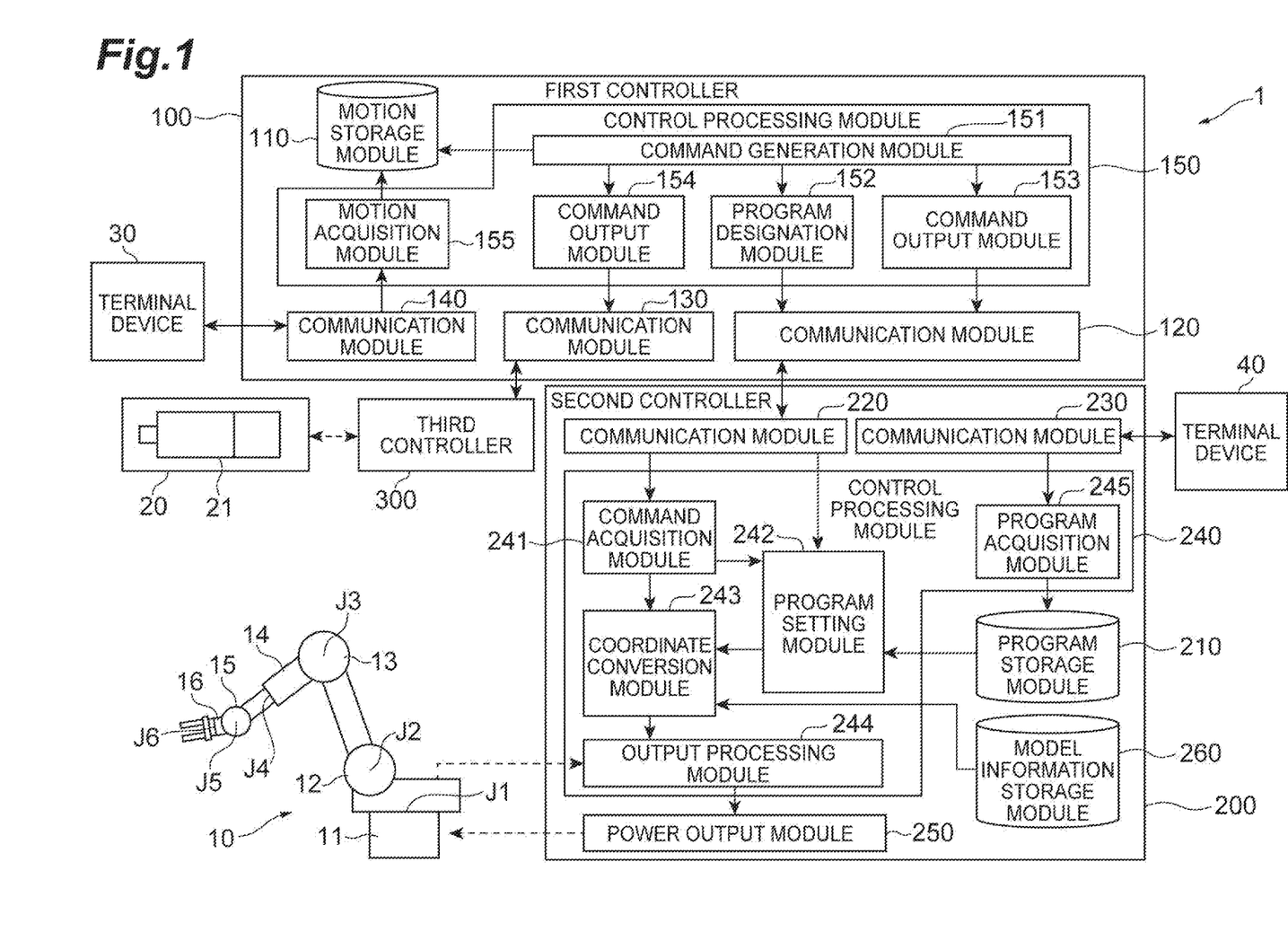
FIG. 1 is a block diagram showing a functional configuration of an example control system.

An example control system 1 may be configured to control two or more types of controlled objects so as to execute a series of processes. As shown in FIG. 1, the control system 1 includes a first controller 100 (e.g., a "unifying controller") that controls two or more controlled objects, a second controller 200 (e.g., a "robot controller") that controls a multi axis robot 10 in accordance with a command from the first controller, and a third controller 300 (e.g., an "auxiliary controller") that controls a peripheral device 20 of the multi-axis robot 10 in accordance with a command from the first controller.

The multi-axis robot 10 may comprise, for example, a serial linked vertically articulated robot, including two or more (for example, six axes) joint axes J1 to J6 and two or more actuators 11 to 16 for driving the respective joint axes J1 to J6. The peripheral device 20 includes, for example, a servomotor 21, and operates it as a power source. For example, the peripheral device 20 holds a workpiece which is a target of a job performed by the multi-axis robot 10 and adjusts the position (e.g., spatial position) and attitude (e.g., angular position with respect to one or more axes) of the workpiece in cooperation with the job performed by the multi-axis robot 10.

In some embodiments, the first controller 100 may comprise, for example, a PLC (Programmable Logic Controller), which may be configured to execute two or more control processes via the second controller 200 and the third controller 300 in a predetermined order according to a predetermined signal input. In each control process, the first controller 100 outputs an operation command (for example, a target value of position control) to the second controller 200 and the third controller 300 at a predetermined control cycle. The first controller 100 may comprise any type of controller configured to control two or more controlled objects, and may be a so-called machine controller.

The first controller 100 includes a motion storage module 110, communication modules 120, 130, and 140, and a control processing module 150 as a functional configuration (hereinafter referred to as "functional module").

The motion storage module 110 stores information defining the operation content of the multi-axis robot 10 and the peripheral device 20 (hereinafter referred to as "motion information"). The motion information includes, for example, information for designating a coordinate conversion program used for controlling the multi-axis robot 10 (hereinafter referred to as "program designation information"), and a list or database in which operation commands to be output to the multi-axis robot 10 and the peripheral device 20 are arranged in chronological order.

The communication module 120 inputs and outputs information to and from the second controller 200. The communication module 130 inputs and outputs information to and from the third controller 300. The communication module 140 inputs and outputs information to and from a terminal device 30. The terminal device 30 is used for programming motion information.

The control processing module 150 is configured to output the program designation information and the first operation command for operating the multi-axis robot 10 to the second controller 200 via the communication module 120, and output the second operation command to the third controller 300 via the communication module 130.

For example, the control processing module 150 includes a command generation module 151, a program designation module 152, command output modules 153 and 154, and a motion acquisition module 155 as further divided functional modules.

The command generation module 151 acquires the program designation information from the motion information stored in the motion storage module 110, and generates the first operation command and the second operation command for each control cycle based on the motion information. The program designation information comprises, for example, the identification number of the coordinate conversion program. The first operation command comprises numerical data for specifying the position and attitude target value of the tip portion of the multi-axis robot 10 in a coordinate system for system control (hereinafter referred to as "first coordinate system") such as the orthogonal coordinate system. The second operation command comprises, for example, numerical data that defines an angle target value of the servomotor 21 of the peripheral device 20.

The program designation module 152 outputs the program designation information to the second controller 200 via the communication module 120. The command output module 153 outputs the first operation command to the second controller 200 via the communication module 120.

The command output module 154 outputs the second operation command to the third controller 300 via the communication module 130.

The motion acquisition module 155 acquires motion information programmed with a predetermined language (hereinafter referred to as "first programming language") from the terminal device 30 via the communication module 140, and stores the motion information in the motion storage module 110. The first programming language is, for example, an industrial programming language. Specific examples of industrial programming languages include LD (Ladder Diagram), FBD (Function Block Diagram), SFC (Sequential Function Chart), IL (Instruction List), and ST (Structured Text).

The second controller 200 may comprise, for example, a robot controller configured to control the multi-axis robot 10 in accordance with a command from the first controller 100. The second controller 200 includes a program storage module 210, a model information storage module 260, communication modules 220 and 230, a control processing module 240, and a power output module 250 as a functional configuration (hereinafter referred to as "functional module")

The program storage module 210 stores two or more coordinate conversion programs. The program storage module 210 may comprise a storage device. The coordinate conversion programs may be designated in the motion information programmed by the first programming language, and may comprise an application programming interface (API) for converting the first coordinate system to a coordinate system for control of the multi-axis robot 10 (for example, joint coordinate system of joint axes J1 to J6, hereinafter referred to as "second coordinate system"). The coordinate conversion programs are programmed by a second programming language different from the first programming language for programming the content of control of the first controller 100. The coordinate conversion programs may be hard-coded by the second programming language. In some example embodiments, the content of coordinate conversion may be hard-coded in a non-editable format, i.e. content that the user is unable to edit. Specific examples of the second programming language include C language, Basic, assembler, Pascal, and the like.

Two or more coordinate conversion programs may include two or more coordinate conversion programs corresponding to two or more types of first controllers 100 having different reference coordinate systems respectively. The coordinate conversion programs may include two or more coordinate conversion programs corresponding to a plurality of types of multi-axis robots 10 respectively. In addition, the coordinate conversion programs may include two or more coordinate conversion programs each corresponding to the combination of the types of first controllers 100 and the types of multi-axis robots 10 respectively.

The model information storage module 260 stores model information of the multi-axis robot 10. The model information includes numerical data indicating the mechanical parameters and the control parameters of the multi-axis robot 10, such as the structure, size, mass, etc. of the multi-axis robot 10, and the rated output and the control gain of the actuators 11 to 16.

The model information storage module 260 may also include two or more pieces of model information corresponding to two or more types of multi-axis robots 10 respectively. The multi-axis robots 10 may include any type of multi-axis robot that may be controlled by the second controller 200. Example types of multi-axis robots 10 may include a horizontally articulated robot, a parallel linked robot, other types of multi-axis robots in addition to the serial linked vertically articulated robot described above, or any combination thereof.

The communication module 220 (a first communication module or a first communication device) inputs and outputs information to and from the first controller 100. The communication module 230 (a second communication module or a second communication device) inputs and outputs information to and from a terminal device 40. The terminal device 40 is used for registering the coordinate conversion programs.

The power output module 250 outputs driving power to two or more joint axes J1 to J6 of the multi-axis robot 10.

The control processing module 240 is configured to acquire program designation information for designating one of two or more coordinate conversion programs from the first controller 100 via the communication module 120. Additionally, the control processing module 240 may be configured to acquire an operation command (the above first operation command) in the coordinate system for the first controller 100 from the first controller 100 via the communication module 120, and to convert the first operation command to an operation target value of two or more joint axes J1 to J6 of the multi-axis robot 10. The first operation command may be converted to the operation target value using the coordinate conversion programs according to the program designation information. The driving power may be output according to the operation target value to the joint axes J1 to J6 via the power output module 250. The control processing module 240 may further be configured to acquire the coordinate conversion programs from the terminal device 40 via the communication module 230, and to store the coordinate conversion programs in the program storage module 210.

The control processing module 240 may comprise a command acquisition module 241, a program setting module 242, a coordinate conversion module 243, an output processing module 244, and a program acquisition module 245 as further divided functional modules. In some example embodiments, the control processing module 240 may comprise a processing device.

The command acquisition module 241 acquires a command relating to the control of the multi-axis robot 10, such as the first operation command, from the first controller 100 via the communication module 220.

The program setting module 242 acquires the program designation information from the first controller 100 via the communication module 120 to select one of the coordinate conversion programs stored in the program storage module 210 according to the program designation information.

Using the coordinate conversion programs selected by the program setting module 242, the coordinate conversion module 243 converts the first operation command to the operation target value of the joint axes J1 to J6 of the multi-axis robot 10. Using the coordinate conversion programs selected by the program setting module 242, the coordinate conversion module 243, for example, converts the first operation command in the first coordinate system to the operation command in the second coordinate system, and generates the operation target value of the joint axes J1 to J6 by an inverse kinematics calculation using the operation command and the model information stored in the model information storage module 260.

The output processing module 244 outputs driving power according to the operation target value generated by the coordinate conversion module 243. The driving power is output to the joint axes J1 to J6 via the power output module 250.

The program acquisition module 245 acquires the coordinate conversion programs from the terminal device 40 via the communication module 230 to and stores the coordinate conversion programs the program storage module 210.

The third controller 300 comprises, for example, a servo controller, and is configured to control the servomotor 21 so as to operate the peripheral device 20 in accordance with the second operation command output from the first controller 100.

Figure 2:
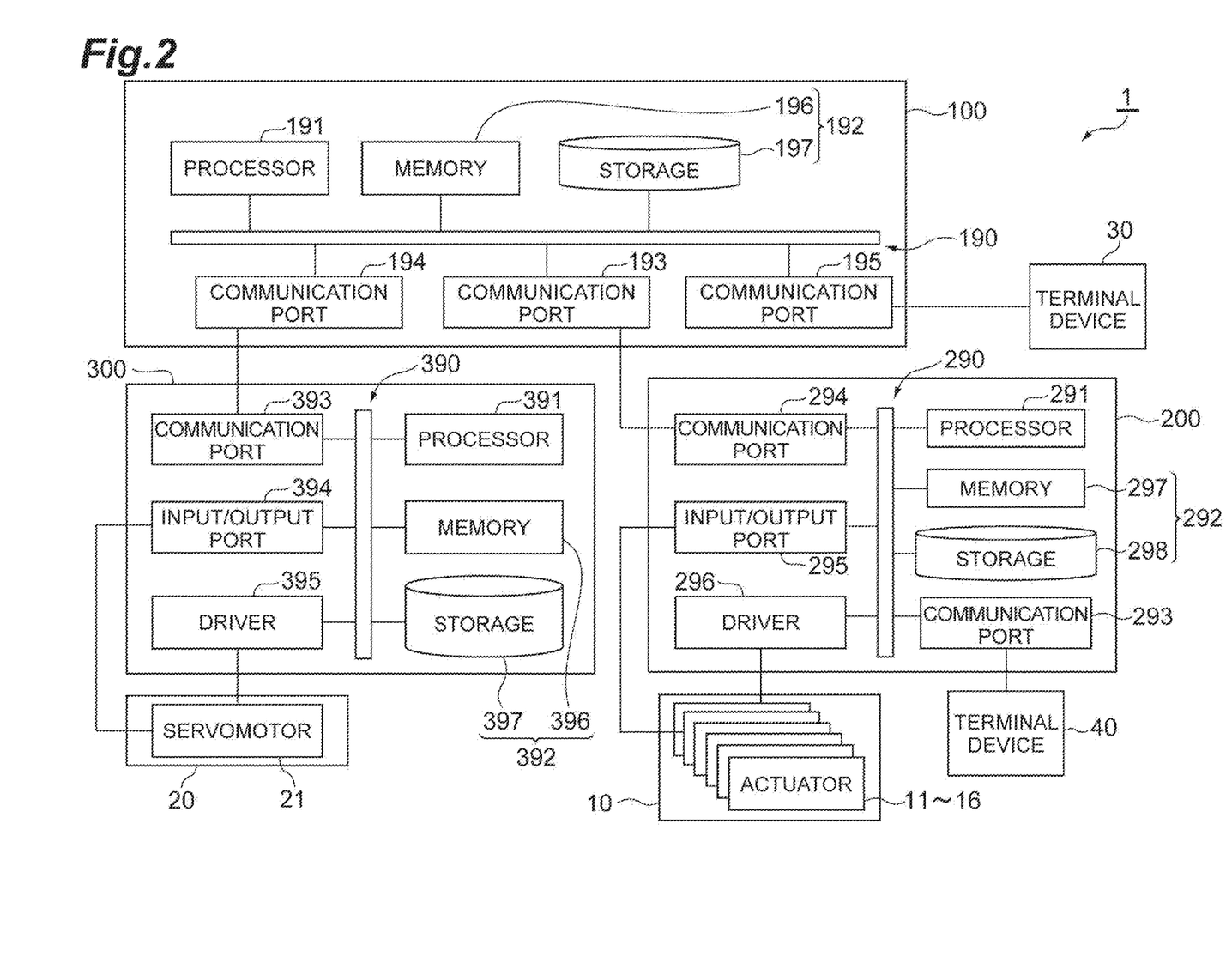
FIG. 2 is a block diagram showing a hardware configuration of an example control system.

FIG. 2 is a block diagram showing an example hardware configuration of a control system. As shown in FIG. 2, the first controller 100 includes a circuit 190. The circuit 190 includes one or more processors 191, a storage module 192, and communication ports 193, 194, and 195.

The storage module 192 may comprise one or both of a memory device 196 and a storage device 197. In some example embodiments, the storage device 197 functions as the motion storage module 110 (FIG. 1) and records a program used to configure each functional module of the control processing module 150. The storage device 197 may comprise any type of storage device that is computer readable. Specific examples of the storage device 197 include a hard disk, a nonvolatile semiconductor memory, a magnetic disk, an optical disk, and the like. The memory device 196 temporarily stores the program loaded from the storage device 197, the results calculated by the one or more processors 191, and the like. The one or more processors 191 executes programs in cooperation with the memory device 196, thereby constituting each functional module of the control processing module 150. That is, the one or more processors 191 may be configured to function as the control processing module 150 (FIG. 1).

The communication port 193 performs information communication (for example, high-speed serial communication) with the communication port 294 (described later) of the second controller 200 in accordance with a command from the processors 191. The communication port 193 functions as the communication module 120.

The communication port 194 performs information communication (for example, high-speed serial communication) with the communication port 393 (described later) of the third controller 300 in accordance with a command from the one or more processors 191. The communication port 194 may be configured to function as the communication module 130 (FIG. 1).

The communication port 195 performs information communication (for example, high-speed serial communication) with the terminal device 30 in accordance with a command from the one or more processors 191. The communication port 195 may be configured to function as the communication module 140 (FIG. 1).

The second controller 200 includes a circuit 290. The circuit 290 includes one or more processors 291, a storage module 292, communication ports 293 and 294, an input/output port 295, and a driver 296.

The storage module 292 may comprise one or both of a memory device 297 and a storage device 298. In some example embodiments, the storage device 298 functions as one or both of the program storage module 210 and the model information storage module 260 device, and records a program used to configure each functional module of the control processing module 240 (FIG. 1). The storage device 298 may comprise any type of storage device that is computer readable. Specific examples of the storage device 197 include a hard disk, a nonvolatile semiconductor memory, a magnetic disk, an optical disk, and the like. The memory device 297 temporarily stores the program loaded from the storage device 298, the results calculated by the one or more processors 291, and the like. The one or more processors 291 execute programs in cooperation with the memory device 297, thereby constituting each functional module of the control processing module 240. That is, the one or more processors 291 may be configured to function as the control processing module 240 (FIG. 1).

The communication port 294 performs information communication with the communication port 193 of the first controller 100 in accordance with a command from the one or more processors 291. The communication port 294 may be configured to function as the communication module 220 (FIG. 1).

The communication port 293 performs information communication (for example, high-speed serial communication) with the terminal device 40 in accordance with a command from the processor 291. The communication port 293 may be configured to function as the communication module 230.

The input/output port 295 acquires electric signals indicating the angles of the joint axes J1 to J6 from the actuators 11 to 16 in accordance with a command from the one or more processors 291. The driver 296 outputs driving power to the actuators 11 to 16 in accordance with a command from the one or more processors 291. The input/output port 295 may be configured to function as the power output module 250.

The third controller 300 may include a circuit 390. The circuit 390 includes one or more processors 391, a storage module 392, a communication port 393, an input/output port 394, and a driver 395.

The storage module 392 may comprise one or both of a memory device 396 and a storage device 397. The storage device 397 records a program for controlling the peripheral device 20. The storage device 397 may comprise any type of storage device that is computer readable. Specific examples of the storage device 397 include a hard disk, a nonvolatile semiconductor memory, a magnetic disk, an optical disk, and the like. The memory device 396 temporarily stores the program loaded from the storage device 397, the calculation result by the one or more processors 391, and the like. The one or more processors 391 execute a program in cooperation with the memory device 396 to execute control of the peripheral device 20 in accordance with the second operation command.

The communication port 393 performs information communication with the communication module 130 of the first controller 100 in accordance with a command from the processor 391.

The input/output port 394 acquires an electric signal indicating the rotation angle of the servomotor 21 in accordance with a command from the one or more processors 391. The driver 395 outputs driving power to the servomotor 21 in accordance with a command from the one or more processors 391.

The hardware configuration of the controller 100, 200, or 300 is not necessarily limited to the configuration in which programs operate each functional block. For example, at least part of the functional modules of the controller 100, 200, or 300 may be constituted by a dedicated logic circuit or an ASIC (Application Specific Integrated Circuit) in which the dedicated logic circuits are integrated.

[Control Method]

Next, a control processing procedure in the first controller 100, a control processing procedure in the second controller 200, and a procedure for registering the coordinate conversion programs in the second controller 200 will be described as an example of a control method.

(Control Processing Procedure in First Controller)

Figure 3:
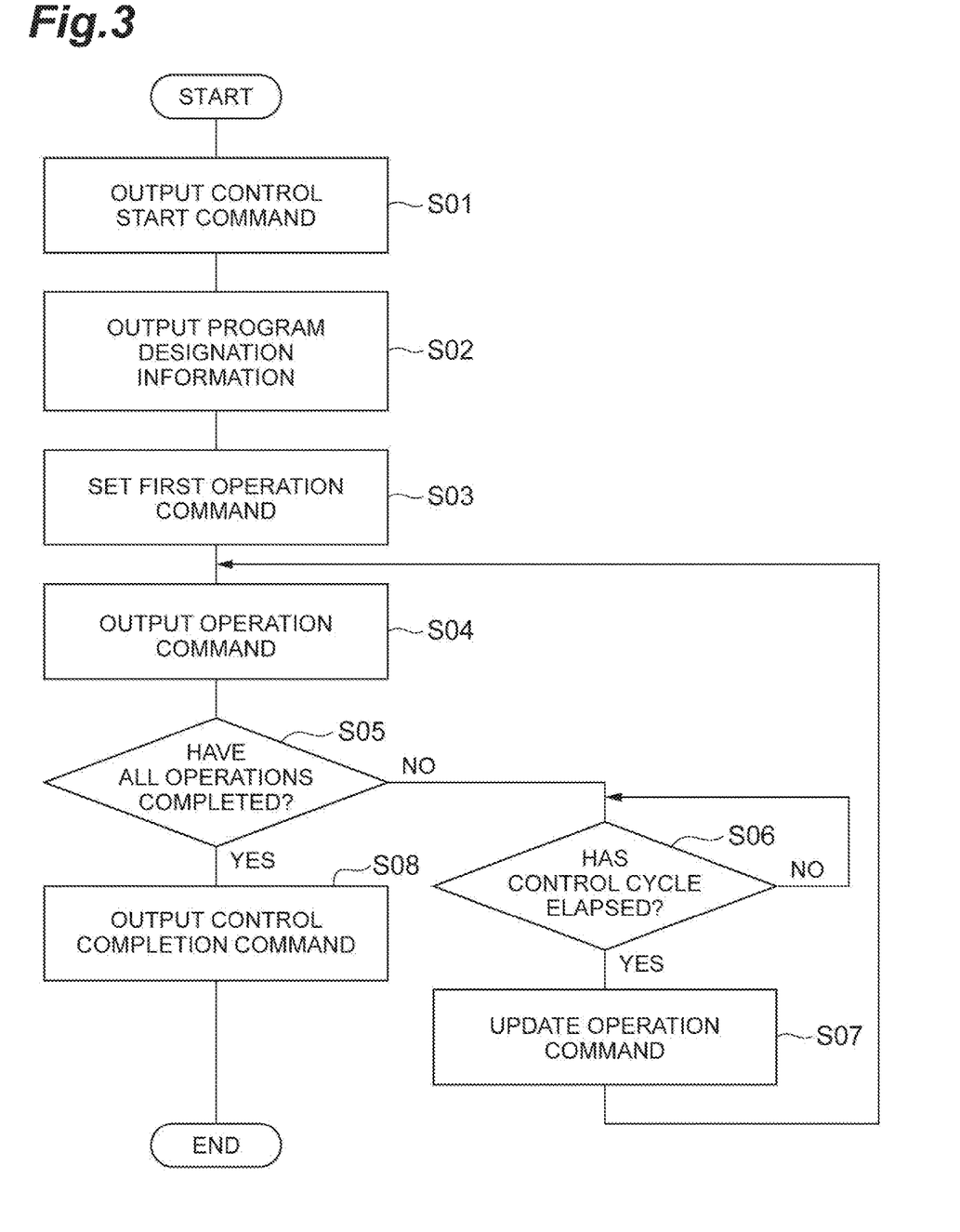
FIG. 3 is a flowchart showing a control procedure of an example first controller.

In some example embodiments, the first controller 100 may be configured to sequentially execute some or all of the steps illustrated in FIG. 3 and as further described below. Whereas some of the steps may additionally be described as being executed by one or more "modules," in some example embodiments some or all of the steps may be performed by one or more processing devices and/or hardware devices, and as further described above with respect to the example hardware configuration illustrated in FIG. 2. In step S01, the command generation module 151 outputs a start command of the control of the multi-axis robot 10 to the second controller 200, for example via the command output module 153 and the communication module 120. Additionally, a start command of control of the peripheral device 20 may be output to the third controller 300, for example via the command output module 154 and the communication module 130.

In step S02, the command generation module 151 acquires the program designation information from the motion information stored in the motion storage module 110, and the program designation module 152 outputs the program designation information to the second controller 200 via the communication module 120.

In step S03, the command generation module 151 generates a first operation command and a second operation command after the start of the control based on the motion information stored in the motion storage module 110.

In step S04, the command output module 153 outputs the first operation command generated by the command generation module 151 to the second controller 200 via the communication module 120. Additionally, the second operation command generated by the command generation module 151 may be output to the third controller 300 via the communication module 130.

In step S05, the command generation module 151 checks whether the output of all the operation commands defined by the motion information has been completed.

In response to determining in step S05 that one or more operation commands have not been completed, the first controller 100 executes step S06. In step S06, the command generation module 151 waits for the elapse of the control cycle.

In step S07, the command generation module 151 generates a first operation command and a second operation command for the next control cycle based on the motion information stored in the motion storage module 110.

Thereafter, the process returns to step S04. Thereafter, the output of the first operation command, the output of the second operation command, and the update of the operation command are repeated in the control cycle until the output of all operation commands is completed.

In response to determining in step S05 that all the operation commands have been completed, the process proceeds to step S08, and the command generation module 151 outputs a completion command of control of the multi-axis robot 10 to the second controller 200 via the command output module 153 and the communication module 120. Additionally, the command generation module 151 may output a completion command of control of the peripheral device 20 to the third controller 300 via the command output module 154 and the communication module 130. The control processing procedure in the first controller 100 is thus completed.

(Control Processing Procedure in Second Controller)

Figure 4:
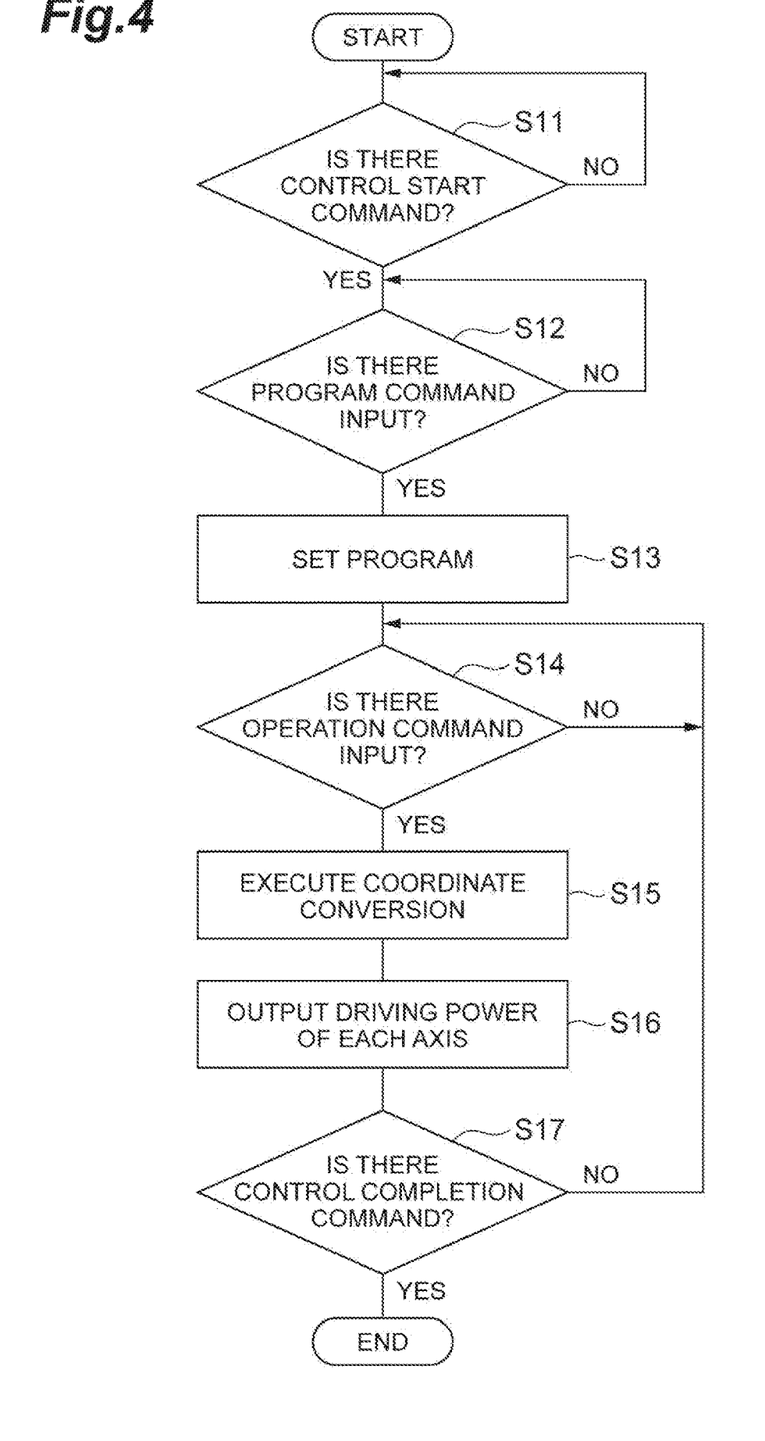
FIG. 4 is a flowchart showing a control procedure of an example second controller.

In some example embodiments, the second controller 200 may be configured to sequentially execute some or all of the steps illustrated in FIG. 4 and as further described below. Whereas some of the steps may additionally be described as being executed by one or more "modules," in some example embodiments some or all of the steps may be performed by one or more processing devices and/or hardware devices, and as further described above with respect to the example hardware configuration illustrated in FIG. 2. In step S11, the command acquisition module 241 checks the reception status of the command from the communication module 120 to the communication module 220, and waits for the input of a start command of control of the multi-axis robot 10.

In step S12, the program setting module 242 checks the reception status of the command from the communication module 120 to the communication module 220, and waits for the input of the program designation information.

In step S13, the program setting module 242 acquires the program designation information from the first controller 100 via the communication module 220 to select one of the coordinate conversion programs stored in the program storage module 210 according to the program designation information.

In step S14, the command acquisition module 241 checks the reception status of the command from the communication module 120 to the communication module 220, and waits for the input of the first operation command.

In step S15, the command acquisition module 241 acquires the first operation command. Thereafter, using the coordinate conversion programs selected by the program setting module 242, the coordinate conversion module 243 converts the first operation command to the operation target value of the joint axes J1 to J6 of the multi-axis robot 10. Using the coordinate conversion programs selected by the program setting module 242, the coordinate conversion module 243, for example, converts the first operation command in the first coordinate system to the operation command in the second coordinate system, and generates the operation target values of the joint axes J1 to J6 by an inverse kinematics calculation using the operation command and the model information stored in the model information storage module 260.

In step S16, the output processing module 244 outputs driving power according to the operation target value generated by the coordinate conversion module 243 to the joint axes J1 to J6 via the power output module 250.

In step S17, the command acquisition module 241 checks the reception status of the command from the communication module 120 to the communication module 220, and checks whether the completion command of control of the multi-axis robot 10 has been input or received.

In response to determining in step S17 that the completion command has not been input or received, the process returns to step S14. Thereafter, the acquisition of the first operation command, the coordinate conversion, and the output of the driving power are repeated in the control cycle until the completion command is received.

In response to determining in step S17 that the completion command has been input or received, the control processing procedure in the second controller 200 is thus completed.

(Procedure for Registering Coordinate Conversion Programs in Second Controller)

Figure 5:
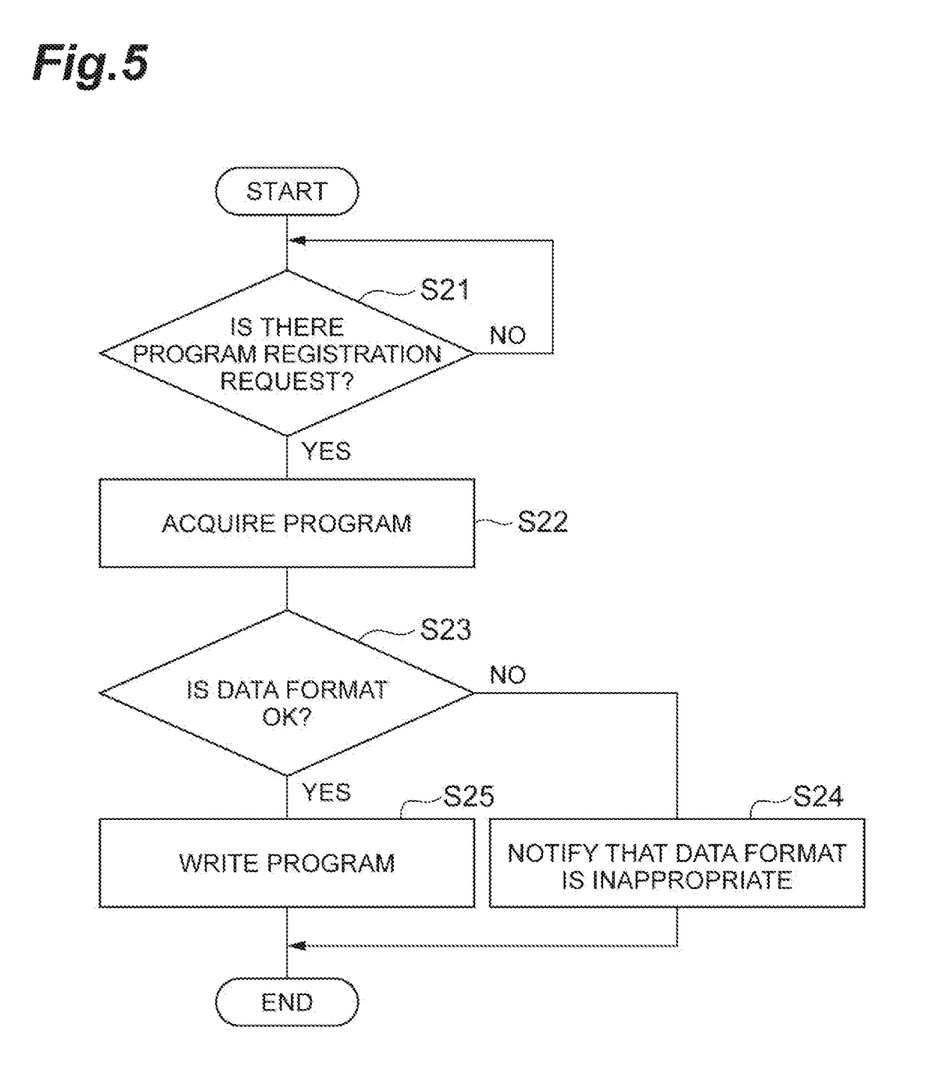
FIG. 5 is a flowchart showing a procedure for registering an example coordinate conversion program.

In some example embodiments, the second controller 200 may be configured to sequentially execute some or all of the steps illustrated in FIG. 5 and as further described below. Whereas some of the steps may additionally be described as being executed by one or more "modules," in some example embodiments some or all of the steps may be performed by one or more processing devices and/or hardware devices, and as further described above with respect to the example hardware configuration illustrated in FIG. 2. In step S21, the program acquisition module 245 checks the reception status of data from the terminal device 40 to the communication module 230, and waits for the input of a registration request for the coordinate conversion program.

In step S22, the program acquisition module 245 acquires the coordinate conversion programs from the terminal device 40.

In step S23, the program acquisition module 245 checks whether the data format of the acquired program is a format available in the coordinate conversion module 243. For example, the program acquisition module 245 checks whether the form of an arguments of the program matches the data format of the first coordinate system, whether the number of output data of the program matches the data format of the second coordinate system, and the like.

In response to determining in step S23 that the program data format is not available in the coordinate conversion module 243, the process proceeds to step S24. In step S24, the program acquisition module 245 outputs to the terminal device 40 a message notifying that the data format is inappropriate.

In response to determining in step S23 that the program data format is available in the coordinate conversion module 243, the process proceeds to step S25. In step S25, the program acquisition module 245 stores the acquired program in the program storage module 210. The acquisition processing of the coordinate conversion programs is thus completed.

The control system 1 includes the first controller 100 configured to control two or more controlled objects, and the second controller 200 configured to control the multi-axis robot 10 in accordance with a command from the first controller 100. In some example embodiments, the second controller 200 includes the power output module 250 configured to output driving power to the joint axes J1 to J6 of the multi-axis robot 10, and the program storage module 210 configured to store the coordinate conversion programs. Additionally, the second controller may include the communication module 220 configured to input and output information to and from the first controller 100, and the control processing module 240. The control processing module 220 may be configured to acquire program designation information for designating one of the coordinate conversion programs from the first controller 100 via the communication module 220, and configured to acquire a first operation command in the coordinate system for the first controller 100 from the first controller 100 via the communication module 220. Additionally, the control processing module 220 may be configured to convert the first operation command to the operation target value of the joint axes J1 to J6 of the multi-axis robot 10 using the coordinate conversion programs according to the program designation information. The driving power may be output according to the operation target value to the joint axes J1 to J6 via the power output module 250.

In a case where operation programming of the multi-axis robot 10 is executed with the second controller 200, the user interface for the programming may be limited to the user interface of the second controller 200. For example the operation programming of the multi-axis robot 10 may be enabled with a user interface of the first controller 100 in which a conversion program for automatically converting the input content for the user interface of the first controller 100 to the input content for the user interface of the second controller 200 is installed.

In contrast, in some example embodiments of the control system, the control processing module 240 of the second controller 200 may be configured to acquire the program designation information and the first operation command from the first controller 100, convert the operation command to the operation target value of the joint axes J1 to J6 of the multi-axis robot 10 using the coordinate conversion programs according to the program designation information, and output driving power according to the operation target value to the joint axes J1 to J6 via the power output module 250. Therefore, as long as the program designation information and the first operation command are output, the operation programming of the multi-axis robot 10 may be executed with the first controller 100 regardless of the type of the user interface. Further, the program designation information allows the coordinate conversion programs according to the type of the multi-axis robot 10 to be designated, enabling operation programming of various multi-axis robots 10. Therefore, this control system is effective in enabling operation programming of various robots with various user interfaces.

In some example embodiments, the second controller 200 may further include the communication module 230 for inputting and outputting information to and from the terminal device 40. Additionally, and the control processing module 240 may be configured to acquire the coordinate conversion programs from the terminal device 40 via the communication module 230 to store it in the program storage module 210. By registering the coordinate conversion programs, the operation programming of a variety of different robots may be effectively executed.

In some example embodiments, two or more coordinate conversion programs may include a coordinate conversion program programmed by a second programming language different from the first programming language for programming the content of control of the first controller 100. By using a language suitable for local processing in the second controller 200 as the second programming language without being bound by the first programming language the speed and efficiency of the coordinate conversion may be increased.

The plurality of coordinate conversion programs may include two or more coordinate conversion programs corresponding to two or more types of first controllers 100 having different coordinate systems respectively. Accordingly, operation programming of a robot with more various user interfaces may be effectively executed.

The coordinate conversion programs may include two or more coordinate conversion programs corresponding to two or more types of multi-axis robots 10 respectively. Accordingly, operation programming of a variety of different robots may be effectively executed.

Although the embodiments have been described above, the present invention is not necessarily limited to the above-described embodiments, and various modifications may be made without departing from the scope of the invention.

Indeed, the novel devices, systems, and methods described herein may be embodied in a variety of other forms; furthermore, various omissions, substitutions and changes in the form of the devices, systems and methods described herein may be made without departing from the spirit of the inventions. The accompanying claims and their equivalents are intended to cover such forms or modification as would fall within the scope and spirit of the inventions.

Certain aspects, advantages, and novel features of the embodiment have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

Regarding the above embodiments, the following appendices are appended.

[Appendix 1] A control system comprising:
a first controller configured to control two or more controlled objects; and
a second controller configured to control a multi-axis robot in accordance with a command from the first controller,
wherein the second controller includes:
a power output module configured to output driving power to two or more joint axes of the multi-axis robot,
a storage module configured to store two or more coordinate conversion programs,
a first communication module configured to input and output information to and from the first controller, and
a control processing module configured to:
acquire program designation information for designating any one of the coordinate conversion programs from the first controller via the first communication module,
acquire an operation command in an coordinate system for the first controller from the first controller via the first communication module,
convert the operation command to an operation target value of the joint axes of the multi-axis robot using the coordinate conversion programs according to the program designation information, and
output the driving power to the joint axes, via the power output module, according to the operation target value.

[Appendix 2] The control system according to appendix 1, wherein the second controller further includes a second communication module configured to input and output information to and from a terminal device, and
wherein the control processing module is further configured to acquire the coordinate conversion programs from the terminal device via the second communication module to store the coordinate conversion programs in the storage module.

[Appendix 3] The control system according to appendix 1 or 2, wherein the coordinate conversion programs includes a coordinate conversion program programmed by a second programming language different from a first programming language for programming a content of control of the first controller.

[Appendix 4] The control system according to any one of appendices 1 to 3, wherein the coordinate conversion programs includes two or more coordinate conversion programs each corresponding to two or more types of the first controllers having mutually different coordinate systems.

[Appendix 5] The control system according to any one of appendices 1 to 4, wherein the coordinate conversion programs includes coordinate conversion programs corresponding to the multi-axis robots respectively.

[Appendix 6] A controller comprising:
a power output module configured to output driving power to two or more joint axes of a multi-axis robot;
a storage module configured to store two or more coordinate conversion programs;

a first communication module configured to input and output information to and from a first controller that controls two or more controlled objects; and
a control processing module configured to:
acquire program designation information for designating any one of the coordinate conversion programs and an operation command in a coordinate system for the first controller from the first controller via the first communication module,
convert the operation command to an operation target value of the joint axes of the multi-axis robot using the coordinate conversion programs according to the program designation information, and
output the driving power according to the operation target value to the joint axes via the power output module.

[Appendix 7] The controller according to appendix 6, further comprising a second communication module configured to input and output information to and from a terminal device,
wherein the control processing module is further configured to acquire a coordinate conversion program from the terminal device via the second communication module to store the coordinate conversion programs in the storage module.

[Appendix 8] The controller according to appendix 6 or 7, wherein the coordinate conversion programs includes a coordinate conversion program programmed by a second programming language different from a first programming language for programming a content of control of the first controller.

[Appendix 9] The controller according to any one of appendices 6 to 8, wherein the coordinate conversion programs includes coordinate conversion programs corresponding to the first controllers having mutually different coordinate systems respectively.

[Appendix 10] The controller according to any one of appendices 6 to 9, wherein the coordinate conversion programs includes coordinate conversion programs each corresponding to the multi-axis robots respectively.

[Appendix 11] A control method performed by a second controller configured to control a multi-axis robot in accordance with a command from a first controller configured to control two or more controlled objects, the control method comprising:
storing two or more coordinate conversion programs;
acquiring program designation information for designating any one of the coordinate conversion programs and an operation command in a coordinate system for the first controller from the first controller;
converting the operation command to an operation target value of a plurality of joint axes of the multi-axis robot using the coordinate conversion programs according to the program designation information; and
outputting driving power to the joint axes according to the operation target value.

[Appendix 12] The control method according to appendix 11, further comprising acquiring and storing the coordinate conversion programs from a terminal device by the second controller.

[Appendix 13] The control method according to appendix 11 or 12, wherein the coordinate conversion programs include a coordinate conversion program programmed by a second programming language different from a first programming language for programming a content of control of the first controller.

[Appendix 14] The control method according to any one of appendices 11 to 13, wherein the coordinate conversion programs includes coordinate conversion programs corresponding to the second controllers having mutually different coordinate systems respectively.

[Appendix 15] The control method according to any one of appendices 11 to 14, wherein the plurality of coordinate conversion programs includes coordinate conversion programs corresponding to the multi-axis robots respectively.

What is claimed is:

1. A control system comprising:
a robot controller for a multi-axis robot; and
a unifying controller, wherein the unifying controller is configured to:
provide operation commands defined in a unifying coordinate system to a plurality of controllers including the robot controller; and
provide program designation information with an operation command to the robot controller, the program designation information designating a coordinate conversion program that converts the operation command defined in the unifying coordinate system to one or more operational target values defined in an operational coordinate system,
wherein the robot controller comprises:
a power output device configured to output driving power to two or more joint axes of a multi-axis robot;
a storage device storing two or more coordinate conversion programs;
a communication device configured to communicate with the unifying controller; and
a processing device configured to:
receive the operation command and the program designation information from the unifying controller;
select the designated coordinate conversion program based on the program designation information from the coordinate conversion programs stored in the storage device;
convert the operation command to the one or more operational target values for controlling the joint axes of the multi-axis robot based on the designated coordinate conversion program; and
output driving power to at least one of the joint axes, via the power output device, according to the one or more operational target values.

2. The control system according to claim 1, wherein the operation command comprises numerical data defining a position and an attitude target value of a tip portion of the multi-axis robot in the unifying coordinate system.

3. The control system according to claim 1, wherein converting the operation command to the one or more operational target values comprises:
converting, using the designated coordinate conversion program, the operation command to a robot operational command defined in the operational coordinate system; and
generating the one or more operational target values based on the robot operational command and based on a model information of the multi-axis robot.

4. The control system according to claim 1, wherein each of the coordinate conversion programs comprises an application programming interface for coordinate conversion.

5. The control system according to claim 1, wherein the communication device comprises a first communication device, wherein the robot controller further comprises a second communication device configured to communicate with a terminal device, and wherein the processing device is further configured to:

acquire a terminal coordinate conversion program from the terminal device via the second communication device; and store the terminal coordinate conversion program in the storage device.

6. The control system according to claim 5, wherein the storage device stores the two or more coordinate conversion programs each of which comply with a format for coordinate conversion, and the processing device is further configured to prohibit storing the terminal coordinate conversion program in the storage device in response to determining that the terminal coordinate conversion program does not comply with the format for coordinate conversion.

7. The control system according to claim 1, wherein the unifying controller generates the operation commands based on a program programmed in a first programming language, and the storage device stores the coordinate conversion programs each of which is programmed in a second programming language different from the first programming language.

8. The control system according to claim 1, wherein the storage device stores the coordinate conversion programs including:

a first coordinate conversion program which corresponds to a first unifying controller which is the unifying controller; and a second coordinate conversion program which corresponds to a second unifying controller associated with a second unifying coordinate system different from the unifying coordinate system.

9. The control system according to claim 8, wherein the processing device is further configured to:

select the first coordinate conversion program as the designated coordinate conversion program based on the program designation information received from the first unifying controller; and convert the operation command to the one or more operational target values based on the first coordinate conversion program.

10. The control system according to claim 1, wherein the coordinate conversion programs include:

a first coordinate conversion program which corresponds to a first multi-axis robot which is the multi-axis robot; and a second coordinate conversion program which corresponds to a second multi-axis robot controlled associated with a second operational coordinate system different from the operational coordinate system.

11. The control system according to claim 10, wherein the processing device is further configured to:

select the first coordinate conversion program as the designated coordinate conversion program based on the program designation information received from the unifying controller; and convert the operation command to the one or more operational target values based on the first coordinate conversion program.

12. The control system according to claim 1, wherein the coordinate conversion programs include:

a first coordinate conversion program which corresponds to a first unifying controller which is the unifying controller, and additionally corresponds to a first multi-axis robot which is the multi-axis robot;

a second coordinate conversion program which corresponds to the first unifying controller, and a second multi-axis robot associated with a second operational coordinate system different from the operational coordinate system;

a third coordinate conversion program which corresponds to a second unifying controller associated with a second unifying coordinate system different from the unifying coordinate system and additionally corresponds to the first multi-axis robot; and a fourth coordinate conversion program which corresponds to the second unifying controller and the second multi-axis robot.

13. The control system according to claim 1, further comprising an auxiliary controller configured to control a peripheral device of the multi-axis robot in response to another operation command received from the unifying controller.

14. The control system according to claim 13, wherein the unifying controller comprises a programmable logic controller or a machine controller, and wherein the auxiliary controller comprises a servo controller.

15. A non-transitory memory device having instructions stored thereon that, in response to execution by a robot controller, cause the robot controller to perform operations comprising:

storing two or more coordinate conversion programs wherein each of the coordinate conversion programs converts an operation command defined in a unifying coordinate system to one or more operational target values defined in an operational coordinate system;

receiving an operation command and program designation information from a unifying controller wherein the operation command is defined in the unifying coordinate system corresponding to the unifying controller, wherein the program designation information designates one of the coordinate conversion programs in the two or more coordinate conversion programs, and wherein the unifying controller is configured to provide operation commands to a plurality of controllers including the robot controller that operate using different coordinate systems;

selecting the designated coordinate conversion program based on the program designation information, wherein the designated coordinate conversion program includes instructions for converting the operation command from the unifying coordinate system corresponding to the unifying controller to the operational coordinate system corresponding to a multi-axis robot having two or more joint axes;

converting the operation command to the one or more operational target values for controlling the joint axes of the multi-axis robot based on the designated coordinate conversion program; and outputting driving power to one or more of the joint axes according to the one or more operational target values.

16. A control method for controlling a robot by a robot controller, the control method comprising:

storing two or more coordinate conversion programs wherein each of the coordinate conversion programs converts an operation command defined in a unifying coordinate system to one or more operational target values defined in an operational coordinate system;

receiving an operation command and program designation information from a unifying controller wherein the operation command is defined in the unifying coordinate system corresponding to the unifying controller, wherein the program designation information designates one of the coordinate conversion programs in the two or more coordinate conversion programs, and wherein the unifying controller is configured to provide operation commands to a plurality of controllers including the robot controller that operate using different coordinate systems;

selecting the designated coordinate conversion program based on the program designation information, wherein the designated coordinate conversion program includes instructions for converting the operation command from the unifying coordinate system corresponding to the unifying controller to the operational coordinate system corresponding to a multi-axis robot having two or more joint axes;

converting the operation command to the one or more operational target values for controlling the joint axes of the multi-axis robot based on the designated coordinate conversion program; and outputting driving power to one or more of the joint axes according to the one or more operational target values.

17. The control method according to claim 16, wherein converting the operation command to the one or more operational target values comprises:

converting, using the designated coordinate conversion program, the operation command to a robot operation command defined in the operational coordinate system corresponding to the multi-axis robot; and generating the one or more operational target values based on the robot operation command and based on a model information of the multi-axis robot.

18. The control method according to claim 16, further comprising acquiring and storing a terminal coordinate conversion program associated with a terminal device.

19. The control method according to claim 16, wherein each of the two or more coordinate conversion programs comply with a format for coordinate conversion from the unifying coordinate system for the unifying controller, and the method further comprises:

acquiring a terminal coordinate conversion program associated with a terminal device; and prohibiting storage of the terminal coordinate conversion program in response to determining that the terminal coordinate conversion program does not comply with the format for coordinate conversion.

20. A unifying controller communicable with a plurality of controllers including a robot controller, the unifying controller comprising circuitry configured to:

provide operation commands defined in a unifying coordinate system to the plurality of controllers including the robot controller; and provide program designation information with an operation command to the robot controller for selecting a coordinate conversion program from two or more coordinate conversion programs stored in the robot controller, the selected coordinate conversion program to convert the operation command to one or more operational target values defined in an operational coordinate system corresponding to a multi-axis robot, the one or more operational target values to control joint axes of the multi-axis robot.

* * * * *